L. WATKINS.
MOTOR.
APPLICATION FILED MAR. 18, 1921.
1,417,003.
Patented May 23, 1922.
2 SHEETS—SHEET 1.
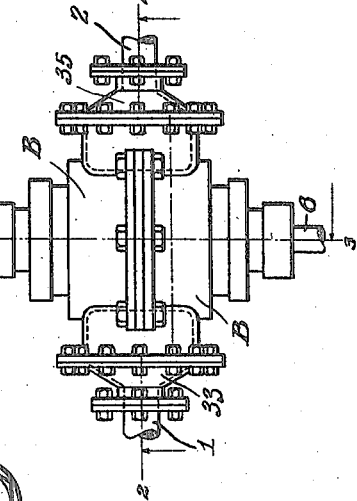
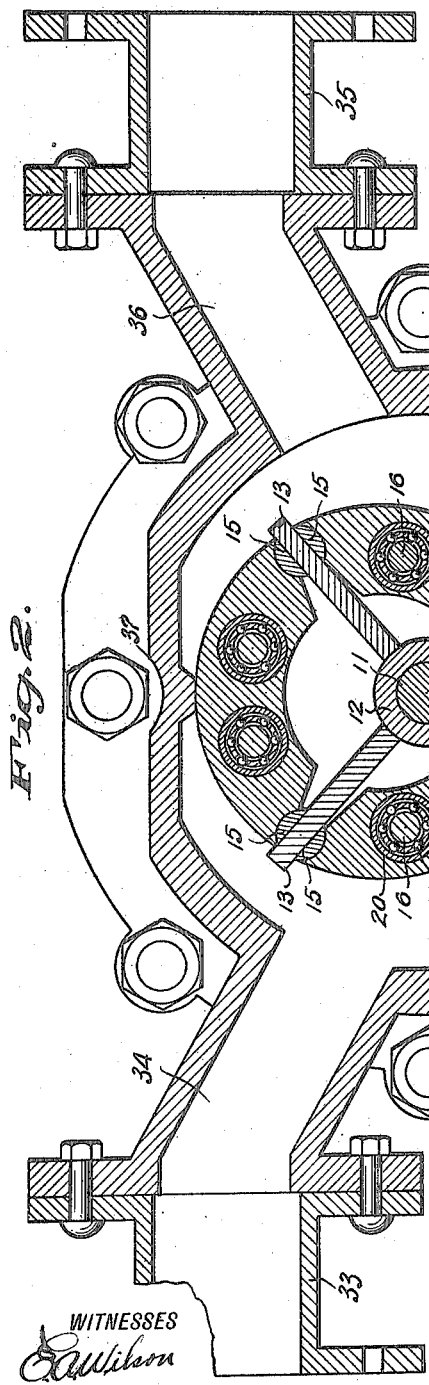
WITNESSES
INVENTOR
LEIGH WATKINS
BY
ATTORNEYS

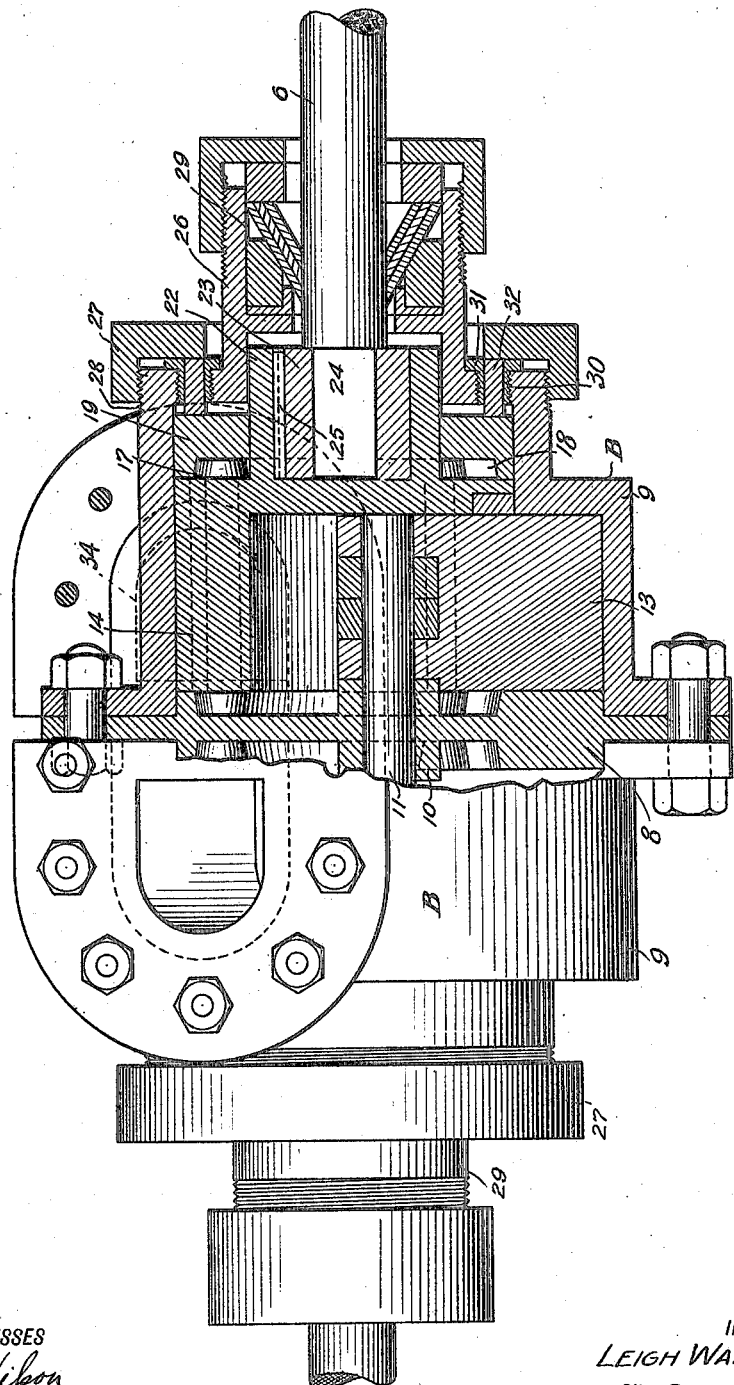

UNITED STATES PATENT OFFICE.

LEIGH WATKINS, OF NEW ORLEANS, LOUISIANA.

MOTOR.

1,417,003.  Specification of Letters Patent.  Patented May 23, 1922.

Original application filed May 12, 1920, Serial No. 380,568. Divided and this application filed March 18, 1921. Serial No. 453,424.

*To all whom it may concern:*

Be it known that I, LEIGH WATKINS, a citizen of the United States, and a resident of New Orleans, in the parish of Orleans and State of Louisiana, have invented a new and Improved Motor, of which the following is a full, clear, and exact description.

This invention relates to improvements in motors, and more particularly to rotary fluid motors, and while I shall hereinafter refer to my invention as a motor, it is obvious that it can function with equal efficiency as a pump and the invention covers broadly the elements and the construction hereinafter described and claimed as applied to a motor or a pump, an object of the invention being to provide an improved construction and arrangement of motor casing or stator and rotor with cooperating parts whereby a maximum of efficiency is had.

This invention is a division of my pending application for patent on power transmission, filed May 12, 1920, and given Serial No. 380,568.

With these and other objects in view the invention consists in certain novel features of construction, and combinations and arrangements of parts, as will be more fully hereinafter described and pointed out in the claims.

In the accompanying drawings—

Figure 1 is a top plan view on a reduced scale of my improved motor or motors, as the motor is illustrated as a power transmitting means for the rear axle of an automobile, and hence, I provide a pair of such motors, one for each axle section, as shown in plan view in Figure 1.

Figure 2 is an enlarged view in section on the staggered line 2—2 of Figure 1.

Figure 3 is a view partly in elevation and partly in longitudinal section, the section being on the line 3—3 of Figure 1.

B, B, represent my improved motors which are shown in connection with axle sections 6, 6, and with manifolds 33 and 35 and supply pipes 1 and 2, whereby fluid is directed into and out of the motors as more particularly set forth in my copending application above referred to.

A partition wall 8 located between the casings 9 of motors B is made with a central bearing 10 providing rotary mounting for a shaft 11, and on the shaft 11 in the respective casings 9, hubs 12 have rotary mounting and are made with radial blades 13. These blades 13 project through an eccentrically mounted cylinder 14 and have roller bearing contacts 15 with said cylinder to prevent leakage and reduce friction to a minimum.

The cylinders 14 of the respective motor casings are guided in their rotary movement by pins 16, the ends of said pins having rollers 17 thereon mounted to turn in circular grooves or guideways 18. The partition 8 is made in its opposite faces with two of these guideways 18, but the outer guideways 18 are formed in adjustable plates 19 which will be more fully hereinafter described.

The cylinders 14 are made with bearing sleeves 20 receiving the pins 16 and provided in said bearing sleeves around the pins with roller bearings 21 to reduce friction to a minimum. The cylinders 14 have integral hub extensions 22 receiving enlargements 23 on the angular ends 24 of the shafts with which they are connected, and said enlargements and hub extensions are connected by keys 25 to compel them to turn together.

Heads 26 are made integral with the casings 9 and these heads are made with stuffing boxes 29 to prevent leakage around the shaft. While I have illustrated a particular type of stuffing box and packing embodying features of novelty, I do not wish to be limited in this case to any particular construction of stuffing box, but desire to cover the use of any stuffing box which is capable of performing the functions desired.

The heads 26 are provided with screw threaded openings 30 receiving tubular bushings 31 in which pins 32 are mounted. These pins 32 engage the rear faces of the plates 19 and the outer ends of the pins are engaged by an adjusting ring 27 having screw threaded engagement, as shown at 28, with the casing 9 so that by adjusting the rings 27, the plates 19 can be moved to compensate for wear of the movable parts.

The main pipe 1 at its rear end communicates with the manifold coupling 33, the latter having openings 34 communicating with the respective motor casings, and the main pipe 2 is connected at the opposite or rear side of the motor casings 9 by the manifold coupling 35 having similar ports or openings 36 communicating with the motor casings.

The motor casings have an abutment or cut-off 37 against which the cylinders 14 move and these cylinders and blades or vanes constitute rotors which operate to force the liquid or be moved by the liquid as is common with rotary motors of this type in general use.

In operation, the fluid entering through manifolds either 33 or 35 and escaping through the other of said manifolds, will exert pressure on the blades 13 to cause the rotary element to move as will be readily understood, and when my improved invention is used as a pump, the movement of the rotary element will force the liquid in either direction as will be readily understood.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. A device of the character described, comprising a casing, a shaft supported concentrically in the casing, a rotor having blades thereon mounted on the shaft, an eccentrically mounted cylinder in the casing through which said blades project, pins in the cylinder, and said casing having grooves therein receiving the ends of the pins.

2. A device of the character described, comprising a casing, a shaft supported concentrically in the casing, a rotor having blades thereon mounted on the shaft, an eccentrically mounted cylinder in the casing through which said blades project, pins having roller bearing mounting in the cylinder, and said casing having grooves therein receiving the ends of the pins.

3. A motor of the character described, comprising a casing, a shaft mounted concentrically in the casing, a rotor on the shaft, an eccentrically mounted cylinder on the rotor, said cylinder having longitudinal bearing sleeves therethrough, pins projecting through the bearing sleeves, roller bearings between the pins and the bearing sleeves, grooved members receiving the ends of the pins, and means for adjusting one of said grooved members relative to the other.

4. A motor of the character described, comprising a casing, a shaft mounted concentrically in the casing, a rotor on the shaft, an eccentrically mounted cylinder on the rotor, said cylinder having longitudinal bearing sleeves therethrough, pins projecting through the bearing sleeves, roller bearings between the pins and the bearing sleeves, grooved members receiving the ends of the pins, pins supported in the ends of the casing and engaging one of the groove carrying members, and an adjusting ring on the casing engaging said last-mentioned pins.

5. A motor of the character described, comprising a casing, a shaft mounted concentrically in the casing, a rotor on the shaft, an eccentrically mounted cylinder on the rotor, said cylinder having longitudinal bearing sleeves therethrough, pins projecting through the bearing sleeves, roller bearings between the pins and the bearing sleeves, grooved members receiving the ends of the pins, one of said grooved members constituting a movable plate, a head on the casing, a ring having screw threaded engagement with the head, and pins supported in the head and located between said ring and said movable plate, whereby the movement of the ring operates to adjust the position of the plate.

6. A motor of the character described, comprising a casing, a shaft mounted concentrically in the casing, a rotor on the shaft, an eccentrically mounted cylinder on the rotor, said cylinder having longitudinal bearing sleeves therethrough, pins projecting through the bearing sleeves, roller bearings between the pins and the bearing sleeves, grooved members receiving the ends of the pins, one of said grooved members constituting a movable plate, a head on the casing, a ring having screw threaded engagement with the head, pins supported in the head and located between said ring and said movable plate, whereby the movement of the ring operates to adjust the position of the plate, and screw threaded bushings located in the end of the cylinder and providing mounting for said pins.

LEIGH WATKINS.